United States Patent [19]

Heinz et al.

[11] Patent Number: 4,641,386
[45] Date of Patent: Feb. 10, 1987

[54] METHOD OF AND DEVICE FOR RESTRAINING THE SLEEPING BODY OF AN ASTRONAUT IN CONDITIONS OF WEIGHTLESSNESS

[75] Inventors: Stoewer Heinz, Ln Kaag Dorp; Ockels Wubbo, An Maastricht, both of Netherlands

[73] Assignee: Agence Spatiale Europeenne, Paris, France

[21] Appl. No.: 750,171

[22] Filed: Jul. 1, 1985

[51] Int. Cl.[4] ............................................. A47C 29/00
[52] U.S. Cl. ........................................ 5/413; 5/449; 5/452
[58] Field of Search ................... 5/415, 449, 454, 482; 2/69.5

[56] References Cited

U.S. PATENT DOCUMENTS

| | | | |
|---|---|---|---|
| 3,761,975 | 10/1973 | Personett | 5/449 |
| 3,831,206 | 8/1974 | Geary | 5/413 |
| 3,842,454 | 10/1974 | Young | 5/413 |
| 4,031,579 | 6/1977 | Larned | 5/449 |
| 4,091,482 | 5/1978 | Malcolm | 5/413 |
| 4,125,909 | 11/1978 | Jacobson | 5/413 |
| 4,531,330 | 7/1985 | Phillips | 5/454 |

FOREIGN PATENT DOCUMENTS 3238795  7/1983  Fed. Rep. of Germany ......... 5/413

Primary Examiner—William F. Pate, III
Assistant Examiner—Dan W. Pedersen
Attorney, Agent, or Firm—Oblon, Fisher, Spivak, McClelland & Maier

[57] ABSTRACT

The present invention provides a method of and a device for restraining the sleeping body of an astronaut in zero-g.

The method comprises providing said sleeping body with extensive proprioceptive cues created by exercising substantial uniformly distributed adjustable pressure on the sleeping body.

The device provides means intended for stressing by stretching the upper and lower sheets of a sleeping bag, in order to create said extensive proprioceptive cues, said stretching means comprising at least one inflatable and deflatable continuous tube inserted in said sleeping bag and secured to it in an appropriate way. Application to manned space flight missions.

8 Claims, 5 Drawing Figures

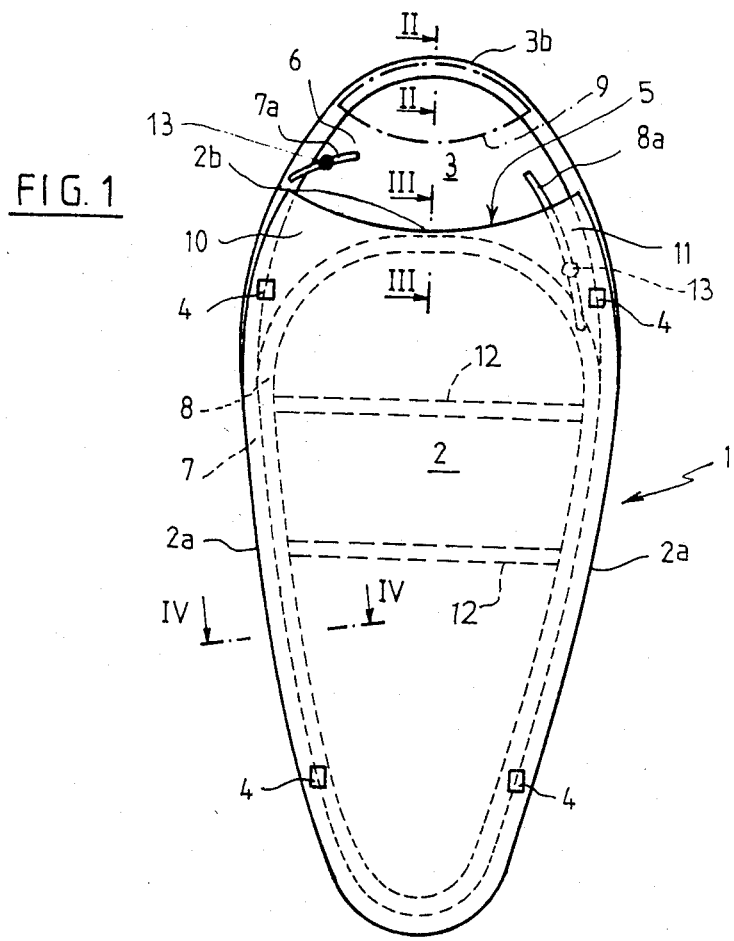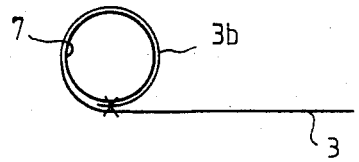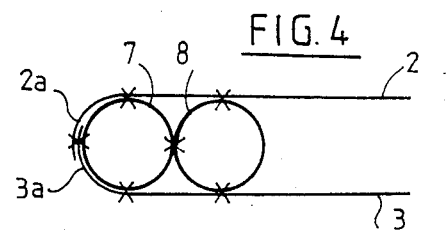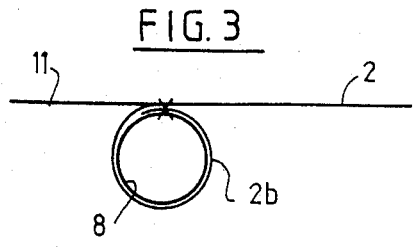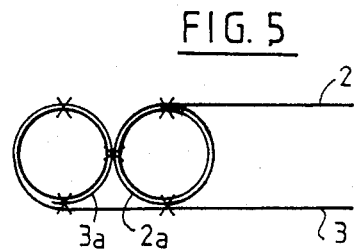

METHOD OF AND DEVICE FOR RESTRAINING THE SLEEPING BODY OF AN ASTRONAUT IN CONDITIONS OF WEIGHTLESSNESS

FIELD OF THE INVENTION

The present invention relates to means for restraining the sleeping body of an astronaut in conditions of weightlessness.

BACKGROUND OF THE INVENTION

Astronauts' sleep in zero-g, i.e. in absence of gravity, is frequently interrupted by the disturbing feeling of being in a state of "free-fall". During non-sleep periods, this feeling can be overcome by a "mental override" which compensates for the unusual physical environment of zero-g.

According to the analysis of Dr. W. Ockels, an ESA Scientist Astronaut, many astronauts have in the past slept continuously for only two to four hours during the first nights in space. Only after re-adjusting their perception of their "actual" state were they able to go back to sleep. Of course, this has a negative effect on their well-being and work effectiveness in space.

DESCRIPTION OF THE PRIOR ART

At present astronauts use sleeping bags made of fire-retardant cotton-like material. They fasten themselves to a pre-determined location with the help of "VELCRO" tape straps ("VELCRO" is a trademark). They normally "free-float" in the space vehicle and in their sleeping bags within the constraints of the fastening straps.

In order to overcome the problem described above, two compensating techniques had been applied to date.

The preferred method of the prior art is that astronauts apply additional straps across their body and attempt to fasten and press themselves against a flat surface (or wall).

Alternatively, they attempt to find a suitable crevice in the space vehicle to wedge themselves into a body restraining location.

Although both methods provide physiological feedback and seem to have lessened the problem, they have not solved it.

GENERAL DESCRIPTION OF THE INVENTION

It is an object of the present invention to provide a method of and a device for restraining the sleeping body of an astronaut in conditions of weightlessness, which responds better to the necessities of practice than the methods intended for the same purpose known previously, namely in that the sleeping restraint method and device provide:

a substantially uniformly distributed pressure over the entire sleeping body in space, a physiological reference environment similar to that on Earth and hence a continuous physiological feedback which can contribute towards improving the quality of sleep in space, an immediate real-time feedback when the sleeping position is changed, and in that the sleeping restraint device:

yields different comfort regimes on the body to best suit its user, is self-contained, i.e. it does not rely on any services from the space vehicle, e.g. from SHUTTLE/-SPACELAB or SPACE STATION, can be activated and de-activated within a few minutes, has dimensions which comply with "space constraints", and accommodates to variable size users without a design or "build" adjustment.

According to the present invention, there is provided a method of restraining the sleeping body of an astronaut in conditions of weightlessness, comprising providing said sleeping body with extensive proprioceptive cues created by exercising substantial uniformly distributed adjustable pressure on said sleeping body.

According to the present invention, there is also provided a device for restraining the sleeping body of an astronaut in conditions of weightlessness, intended for implementing the method according to the present invention, which device is of the type comprising a sleeping bag consisting of an upper and a lower sheet, made of fire-retardant material cloth, and provided with fastening means, said upper and lower sheets having a linking edge, along which they are secured, and a free edge delimiting an aperture through which the astronaut can wedge himself into said sleeping bag, wherein said device comprises means intended for stressing by stretching said upper and lower sheets, in order to press substantially uniformly the astronaut's body simultaneously in a downward and upward direction, respectively, and wherein the free edge of said lower sheet juts out from the free edge of said upper sheet in order to define in said lower sheet an upper portion intended for supporting the astronaut's head and to place it into an Earth-like "normal" position.

According to an advantageous embodiment of the device according to the invention, said stretching means consists of at least one inflatable and deflatable continuous tube inserted in said sleeping bag, to which it is secured, particularly by welding or gluing, and provided with an inflating and deflating hose equipped with a valve, which hose is positioned in the vicinity of the astronaut's head and within reach of either of the astronaut's hands.

According to an advantageous arrangement of this embodiment, said stretching means consists of a single inflatable and deflatable continuous tube which is fully covered by the linking and free edges of said lower sheet, the linking edge of said upper sheet overlapping the linking edge of said lower sheet.

According to a preferred arrangement of this embodiment, said stretching means consists of a first and a second inflatable continuous tubes inserted in said sleeping bag, in order that the first tube is external in relation to the second tube which is internal, said first and second tubes being juxtaposed along and parallel to the linking edges of said upper and lower sheets, and the first (outer) tube being fully covered by the free edge of the lower sheet, whereas the second (inner) tube is fully covered by the free edge of the upper sheet, said tubes being secured to each other and to said sheets, particularly by welding or gluing, and being provided each one with said inflating and deflating hose equipped with said valve.

According to an advantageous feature of this arrangement, said first and second tubes are directly juxtaposed along and parallel to said linking edges and are covered by said upper and lower sheets whose linking edges overlap each other laterally.

According to an advantageous variation of this feature, said first and second tubes are juxtaposed along and parallel to said linking edges by interposing said linking edges, each tube being fully covered by one sheet, and particularly the linking edge of the lower sheet being fully covered by the first (outer, lower) tube, whereas the linking edge of the upper sheet fully covers the second (inner, upper) tube.

According to yet another advantageous embodiment of the device according to the invention, a plurality of horizontal cross tubes links together the sides of the first (lower) tube and/or the second (upper) tube, said cross tubes being disposed at important physiological reference positions and being intended for selective additional stiffening across the body, each cross tube communicating with either said first or second continuous tube.

Besides the foregoing features, the invention comprises yet other features, which will emerge from the description which follows.

The invention will be better understood by means of the additional description which follows with reference to the accompanying drawing given purely by way of non-limiting illustration.

BRIEF DESCRIPTION OF THE DRAWING

In the drawing:

FIG. 1 is a plan view of the preferred embodiment of the sleep restraining device, FIGS. 2 to 3 are sectional schematic views along the section lines II—II and III—III, and FIGS. 4 and 5 are sectional schematic views along the section line IV—IV and show two possible non-limiting mutual arrangements of the essential elements of the device shown in FIG. 1.

It must be well understood, however, that this drawing and the corresponding descriptive portion is given purely by way of illustration of the invention, of which they do not constitute in any way a limitation thereof.

DESCRIPTION OF THE PREFERRED
EMBODIMENT OF THE INVENTION

The device for restraining the sleeping body of an astronaut in conditions of weightlessness, shown in FIG. 1, comprises a sleeping bag 1 consisting of an upper sheet 2 and a lower sheet 3, made of fire-retardant material cloth, e.g. of "NOMEX" cloth—in order to comply with the safety standards for manned space flight—and provided with fastening means (not shown) which normally consist of fastening straps made of double-sided standard "VELCRO" tape intended to be applied by means of one end on the upper sheet 2, e.g. on zones such as those denoted by the numerical reference 4: in such a way, the sleeping bag 1 can be fastened anywhere to SPACELAB or SHUTTLE fixation points.

As "NOMEX" cloth is air transparent and possesses no thermal constraints, the user can sleep in his or her "normal" sleeping garments.

The upper and lower sheets have a linking edge 2a and 3a, along which they are secured, and a free edge 2b and 3b, respectively, delimiting an aperture 5 through which the astronaut can wedge himself, into the sleeping bag 1.

The free edge 3b of the lower sheet 3 juts out from the free edge 2b of the upper sheet 2 in order to define in the lower sheet 3 an upper portion 6 intended for supporting the astronaut's head and to place it into an Earth-like "normal" position.

This sleeping bag 1 is provided, according to the invention, with means intended for stressing by stretching simultaneously said upper and lower sheets, in order to press substantially uniformly the body of the astronaut. Before describing this stretching means, it should be stated that it takes into account the hypothesis developed by Dr. Ockels according to which the feeling of being in a state of "free fall", when sleeping in zero-g, is due to the lack of physiological cues during sleep. In other words, if the astronauts can be provided with physiological feedback, e.g. in the form of a substantially uniform pressure on the body, which pressure should be as Earth-like as possible, the above-mentioned disturbing feeling would be minimized and the chances of a longer, more continuous sleep period increased, in order that the device according to the invention (which, of course, does not eliminate the zero-g effect) contributes towards improving the quality of sleep in space.

Referring now to the stretching means, in the illustrated embodiment it consists of two inflatable and deflatable continous tubes 7 and 8, for example made of "MYLAR", which are inserted in said sleeping bag 1 and determine, after inflation, the device's outer shape. To this effect each tube is provided with an inflating and deflating hose 7a and 8a, which are equipped with a conventional valve 13 (not shown in detail) which is positioned in the vicinity of the astronaut's head and within reach of either of the astronaut's hands, in order to inflate the tubes 7 and 8 by normal mouth blowing.

Of course, should the pressure aohieved by normal mouth blowing prove insufficient for a specific user's need, an optional conventional hand-operated pressure ball can be provided for final pressure adjustment.

In any case, the device according to the present invention is self-contained, i.e. it does not rely on any services from the space vehicle, e.g. from SHUTTLE/SPACELAB or SPACE STATION.

The tubes 7 and 8 stretch the upper and lower sheets 2 and 3 according to the air pressure imparted by its user.

Of course, the pressure on the body is, within a limited range, variable and selectable according to the individual comfort requirements of its user, who can create on its body a pressure as Earth-like as possible.

Furthermore, the device allows all normal sleeping positions, i.e. planar or sideways, with variable limb positions, and it provides immediate real-time feedback when the sleeping position is changed, that is to say that the pressure on the body increases, for example, in the sideways sleeping position (because there is an increased pressure over a smaller body area) or reduces in the planar position, which is analogous to the pressure changes on the body on Earth.

The two tubes 7 and 8 provide some redundancy against loss of pressure, and the inner tube 8 is positioned under the upper sheet 2 in order to provide positive body cues for both planar and sideways positions onto the chest or shoulder.

FIG. 1 shows schematically an optional head restraint 9 which can be attached to the upper portion 6 of the lower sheet 3 in order to hold the head from "above" and prevent it from "floating" into undesired positions.

Furthermore, two lateral ears 10 and 11 jut out from the free edge 2b of the upper sheet 2 and fit over the free edge 3b of the lower sheet 3 to which they are fastened by a conventional system, e.g. by a "VELCRO" system; these ears 10, 11 can be opened for any convenience.

FIGS. 2 to 5 show schematically how the upper and lower sheets 2 and 3 can be secured to the tubes 7 and 8.

The portions of these tubes which are disposed along the free edges of the upper and lower sheets are fully covered by these latter and secured particularly by means of welding or gluing (see FIGS. 2 and 3, where the cross X is a point of the welding or gluing line).

FIGS. 4 and 5 show two non-limiting ways to secure the tubes 7 and 8 to the upper and lower sheets along their linking edges 2a, 3a. In FIG. 4 the tubes 7 and 8 are juxtaposed and are covered by sheets 2 and 3 whose linking edges 2a and 3a overlap each other laterally.

In FIG. 5 each sheet fully covers one tube, namely, for example, the external tube 7 is covered by the lower sheet 3 whereas the inner tube 8 is covered by the upper sheet 2, in order that their linking edges 2a and 3a are juxtaposed and secured by welding or gluing (crosses X show, as in FIGS. 2 and 3, point of welding or gluing lines).

An additional option is the attachment of horizontal cross tubes 12 between the sides of the outer (lower) and/or the inner (upper) tubes 7 and/or 8, in order to provide selective additional stiffening across the body and important physiological reference positions, should this be needed or desired for, e.g., medical tests. A non-limiting indication of the positions in which the cross tubes can be placed is defined by putting them at 40, 70, 100 and 130 cm from the bottom edge of the sleeping bag. Of course, the cross tubes 12 communicate with tubes 7 and/or 8, and they are preferably fully covered by the corresponding sheets.

The device according to the present invention can be inflated and deflated within a few minutes.

Its dimensions comply with "space constraints". The dimensions (W×L×H) of the device, when it is pressurized and ready for use, are approximately 80×200×10 cm, whereas its dimensions are approximately 20×40×5 cm (or, in a more box shape configuration, approximately 20×20×15 cm) when it is folded and stowed.

The weight of such a device is approximately 1 kg.

A first mock-up of the device proposed by Mr. Stoewer has been built and has demonstrated the principles involved in Dr. Ockel's statement and method.

A neutral buoyancy facility test may provide further information on the design utility.

Of course, the full realisation of the effectiveness of the device according to the invention can be proved only in zero-g.

To that effect, the first in-space use and operational test of the device is foreseen during SPACELAB D-1 mission, which is presently scheduled for Autumn 1985.

As emerges from the foregoing, the invention is in no way limited to those of its mode of employment, embodiments, and uses which have been described. It encompasses, on the contrary, all modifications which may come to the spirit of the technician skilled in the art, without departing from the scope, nor the extent, of the present invention. For example, it encompasses the modification which consists in the embodiment comprising two inflatable and deflatable mattresses of known type which are superimposed on one another and interlinked along three of their four edges, each mattress being provided with an inflating and deflating hose equipped with a valve, which hose is positioned in the vicinity of astronaut's head and within the reach of either of the astronaut's hands.

We claim:

1. A device for restraining the sleeping body of an astronaut in conditions of weightlessness, said device comprising:
   (a) a sleeping bag comprising an upper and a lower sheet, made of fire-retardant material cloth, and provided with fastening means for fastening said device to a fixed object, said upper and lower sheets each having a linking edge, along which they are secured, and a free edge delimiting an aperture through which the astronaut can wedge himself into said sleeping bag and
   (b) means for stressing by stretching said upper and lower sheets, in order to press substantially uniformly the astronaut's body simultaneously in a downward and upward direction, respectively, with a pressure selectively variable by the astronaut before going to sleep, said means comprising a first inflatable and deflatable continuous tube secured to and extending around the periphery of said upper sheet and a second inflatable and deflatable continuous tube secured to and extending around the periphery of said lower sheet, said first and second continuous tube each being provided with an inflating and deflating hose equipped with a valve, said hoses being positioned in the vicinity of the astronaut's head and within reach of either of the astronaut's hands,
   (c) wherein an upper portion of said lower sheet juts out from the free edge of said upper sheet, said upper portion being sized, shaped, and positioned to support the astronaut's head and to place it into an Earth-like "normal" position.

2. Device according to claim 1, wherein at least one of said continuous tubes is at least partially covered by the linking and free edges of said lower sheet, the linking edge of said upper sheet overlapping the linking edge of said lower sheet.

3. Device according to claim 1, wherein said first continuous tube is external in relation to said second continuous tube, which is internal, said first and second continuous tubes being juxtaposed along and parallel to the linking edges of said upper and lower sheets and said first continuous tube being fully covered by the free edge of said lower sheet, whereas said second continuous tube is fully covered by the free edge of said upper sheet, said first and second continuous tubes being secured to each other and to said upper and lower sheets.

4. Device according to claim 3, wherein said first and second continuous tubes are directly juxtaposed along and parallel to said linking edges and are covered by said upper and lower sheets, the linking edges of which overlap each other laterally.

5. Device according to claim 3, wherein said first and second continuous tubes are juxtaposed along and parallel to said linking edges by interposing said linking edges, each one of said first and second continuous tubes being fully covered by one sheet, the linking edge of said lower sheet being fully covers said first continuous tube, whereas the linking edge of said upper sheet fully covers said second continuous tube.

6. Device according to claim 1, wherein two lateral ears jut out from the free edge of said upper sheet and fit over the free edge of said lower sheet, to which they are fastened by means allowing opening of said ears.

7. Device according to claim 3, wherein a plurality of horizontal cross tubes link together the sides of said first continuous tube and/or said second continuous tube, said horizontal cross tubes being disposed at important physiological reference positions and adding stiffening across the body, each one of said pluraltiy of horizontal cross tubes communicating with either said first or said second tube.

8. Device according to claim 1, wherein a head restraint is attached to said upper portion of said lower sheet in order to hold the astronaut's head from "above" and prevent it from "floating" into undesired positions.

* * * * *